(12) United States Patent
Uno et al.

(10) Patent No.: US 6,310,137 B1
(45) Date of Patent: Oct. 30, 2001

(54) ACRYLIC POLYMER HAVING MULTILAYER STRUCTURE AND METHACRYLIC RESIN COMPOSITION CONTAINING THE SAME

(75) Inventors: Hirofumi Uno, New York, NY (US); Jun Nakauchi, Tokyo (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/424,851

(22) PCT Filed: Jun. 4, 1998

(86) PCT No.: PCT/JP98/02473
§ 371 Date: Dec. 6, 1999
§ 102(e) Date: Dec. 6, 1999

(87) PCT Pub. No.: WO98/56840
PCT Pub. Date: Dec. 17, 1998

(30) Foreign Application Priority Data

Jun. 9, 1997 (JP) .................................... 9-150786

(51) Int. Cl.$^7$ ............................ C08L 51/06; C08L 33/06; C08L 33/12
(52) U.S. Cl. ............................ 525/71; 525/85; 525/227; 525/228
(58) Field of Search .................................... 428/412, 483, 428/515, 522; 525/71, 78, 85, 227, 228

(56) References Cited

U.S. PATENT DOCUMENTS 4,730,023 * 3/1988 Sato et al. .......................... 525/71
5,521,252    5/1996 Matsuda et al. ....................... 525/255

FOREIGN PATENT DOCUMENTS

| 53-58554 | 5/1978 | (JP) . |
| 60-99114 | 6/1985 | (JP) . |
| 62-230841 | 10/1987 | (JP) . |
| 63-254114 | 10/1988 | (JP) . |
| 3-52910 | 3/1991 | (JP) . |
| 3-199213 | 8/1991 | (JP) . |
| 5-17654 | 1/1993 | (JP) . |

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

A multilayered acrylic polymer comprising an innermost layer polymer (A) formed from a $C_{1-4}$ alkyl methacrylate, a $C_{1-8}$ alkyl acrylate, etc., an intermediate layer polymer (B) formed from a $C_{1-8}$ alkyl acrylate, an aromatic vinyl monomer, etc., and an outermost layer polymer (C) formed from a $C_{1-4}$ alkyl methacrylate, a $C_{1-8}$ alkyl acrylate, etc., and wherein the average value of the coating ratio, i.e. [(minimum thickness of the intermediate layer)÷(maximum thickness of the intermediate layer)]×100, is not less than 30%; and a methacrylic resin composition containing the same. This multilayered acrylic polymer can improve the falling-ball or falling-weight impact strength, resistance to impact whitening, transparency and other properties of the methacrylic resin composition.

5 Claims, No Drawings

ACRYLIC POLYMER HAVING MULTILAYER STRUCTURE AND METHACRYLIC RESIN COMPOSITION CONTAINING THE SAME

TECHNICAL FIELD

This invention relates to multilayered acrylic polymers having excellent falling-ball or falling-weight impact strength, resistance to impact whitening, and transparency, and to methacrylic resin compositions using the same.

BACKGROUND ART

Methacrylic resins are being used for automobile parts, lighting equipment, various panels and the like, because of their excellent transparency, weather resistance, moldability and other properties. However, methacrylic resins generally have insufficient impact resistance, so that many propositions have hitherto been made in order to improve their impact resistance.

For example, Japanese Patent Publication No. 27576/'80 has proposed a technique in which the impact resistance of hard resins such as methacrylic resins is improved by adding thereto a multilayered polymer having a specific basic structure consisting of hard-soft-hard three layers. Moreover, Japanese Patent Publication No. 88903/'93 has proposed a thermoplastic acrylic resin composition containing a hard-soft-hard polymer having a specific structure and specific properties, with a view to improving impact resistance, transparency, and the lowering the variation of haze with temperature. Moreover, Japanese Patent Laid-Open No. 230841/'87 has proposed a method for improving the balance of transparency, gloss, rigidity and impact resistance in multilayered graft copolymers having a semisoft-soft-hard three layers structure. Furthermore, Japanese Patent Laid-Open No. 93056/'94 has proposed a method for improving the Izod impact strength and resistance to impact whitening of a hard-soft-hard three layers emulsion polymer by using an arylalkyl (meth)acrylate in place of styrol (styrene) serving as a component of the elastomer layer, so as to create a well-defined interface between the hard core and the elastomer layer.

However, the term "impact resistance" as used in these propositions exclusively means the impact strength (Izod impact strength) of a specimen having a notch (or cutout). Although this is a common method for evaluating the impact resistance of molded articles having a complicated shape with corners or the like, no particular consideration is given to falling-ball or falling-weight impact strength which is an index to the impact strength of molded articles used chiefly in the form of flat plates such as signboards and various covers. Accordingly, there is room for improvement.

Japanese Patent Publication No. 11970/'85 has proposed a method for improving falling-weight impact strength, solvent resistance and other properties by disposing an intermediate layer respectively between adjacent layers of a specific hard-soft-hard three-layer structure and controlling the particle diameter. Moreover, Japanese Patent Publication No. 17406/'85 has proposed a method for improving falling-weight impact strength, solvent resistance and other properties by controlling the molecular weight of the third layer in a specific hard-soft-hard three-layer structure. However, the degree of improvement brought about by these methods is less than satisfactory, and still leaves room for improvement.

Furthermore, Japanese Patent Laid-Open No. 17654/'93 has proposed a method for improving the gloss, transparency, falling-weight impact strength and processability of a multilayered graft copolymer having a semisoft-soft-hard three layers structure in which, during preparation of the graft copolymer, the addition and polymerization of the monomer to form the third layer is started at the time when the polymer of the second layer has reached a specific degree of polymerization. However, this proposition still fails to achieve sufficiently high transparency and falling-weight impact strength, and resistance to impact whitening also remains to be improved.

DISCLOSURE OF INVENTION

An object of the present invention is to provide a multilayered acrylic polymer which can improve the falling-ball or falling-weight impact strength, resistance to impact whitening, transparency and other properties of thermoplastic resin compositions, as well as a methacrylic resin composition containing this multilayered acrylic polymer.

The present inventors made intensive investigations with a view to solving the above-described problems, and have now discovered that the above-described problems can be solved by a multilayered acrylic polymer having a specific composition and a specific morphological feature. The present invention has been completed on the basis of this discovery.

Specifically, the subject matter of the present invention comprehends a multilayered acrylic polymer comprising an innermost layer polymer (A) obtained by polymerizing a mixture composed of 100 parts by weight of a monomer or monomer mixture comprising 40 to 100% by weight of an alkyl methacrylate having an alkyl group of 1 to 4 carbon atoms, 0 to 60% by weight of an alkyl acrylate having an alkyl group of 1 to 8 carbon atoms, and 0 to 20% by weight of another copolymerizable monomer, and 0.1 to 10 parts by weight of a multifunctional monomer; an intermediate layer polymer (B) obtained by polymerizing a mixture composed of 100 parts by weight of a monomer mixture comprising 70 to 90% by weight of an alkyl acrylate having an alkyl group of 1 to 8 carbon atoms, 10 to 30% by weight of an aromatic vinyl monomer, and 0 to 20% by weight of another copolymerizable monomer, and 0.1 to 5 parts by weight of a multifunctional monomer, in the presence of the innermost layer polymer (A); and an outermost layer polymer (C) obtained by polymerizing a monomer or monomer mixture comprising 50 to 100% by weight of an alkyl methacrylate having an alkyl group of 1 to 4 carbon atoms, 0 to 50% by weight of an alkyl acrylate having an alkyl group of 1 to 8 carbon atoms, and 0 to 20% by weight of another copolymerizable monomer, in the presence of the innermost layer polymer (A) and the intermediate layer polymer (B); and wherein the average value of the coating ratio as defined by the following equation is not less than 30%.

Coating ratio=[(minimum thickness of the intermediate layer)÷(maximum thickness of the intermediate layer)]×100(%)

Moreover, the subject matter of the present invention also comprehends a methacrylic resin composition comprising 5 to 95% by weight of the above-described multilayered acrylic polymer, and 95 to 5% by weight of a methacrylic resin composed chiefly of methyl methacrylate.

As described above, the multilayered acrylic polymer of the present invention has a strictly controlled structure. This structure has been controlled with special attention to the uniformity of coverage of the intermediate layer coating the innermost layer, and its relationship with impact properties, resistance to impact whitening, and transparency. In particular, the present invention defines the coating ratio as a criterion for the uniformity of coverage of the intermediate layer and is based on the discovery that, if this value is not less than 30%, the resulting acrylic polymer will show a marked improvement in impact properties (in particular, falling-ball or falling weight impact strength) and also an improvement in resistance to impact whitening and transparency.

When incorporated into thermoplastic resin compositions such as methacrylic resin compositions, the multilayered acrylic polymer of the present invention can significantly improve their falling-ball or falling-weight impact strength, resistance to impact whitening, transparency and other properties. Moreover, the methacrylic resin compositions of the present invention containing this multilayered acrylic polymer are resin materials having very excellent properties as described above.

BEST MODE FOR CARRYING OUT THE INVENTION

The innermost layer polymer (A) is obtained by polymerizing a mixture composed of 100 parts by weight of a monomer or monomer mixture comprising 40 to 100% by weight, preferably 40 to 95% by weight and more preferably 50 to 70% by weight of an alkyl methacrylate having an alkyl group of 1 to 4 carbon atoms, 0 to 60% by weight, preferably 4 to 59% by weight and more preferably 20 to 50% by weight of an alkyl acrylate having an alkyl group of 1 to 8 carbon atoms, and 0 to 20% by weight of another copolymerizable monomer, and 0.1 to 10 parts by weight and preferably 1 to 5 parts by weight of a multifunctional monomer. By determining its composition so that the amounts of various components come within the aforesaid respective ranges, there can be obtained excellent falling-ball or falling-weight strength, resistance to whitening by impact, and transparency.

Examples of the alkyl methacrylate having an alkyl group of 1 to 4 carbon atoms, which is used herein, include methyl methacrylate, ethyl methacrylate, propyl methacrylate and n-butyl methacrylate. Examples of the alkyl acrylate having an alkyl group of 1 to 8 carbon atoms include methyl acrylate, ethyl acrylate, i-propyl acrylate, n-butyl acrylate and 2-ethylhexyl acrylate. Examples of the other copolymerizable monomer include aromatic vinyl monomers such as styrene, a-methylstyrene and vinyltoluene; non-alkyl methacrylates such as phenyl methacrylate, cyclohexyl methacrylate and benzyl methacrylate; and non-alkyl acrylates corresponding thereto. Among others, aromatic vinyl monomers are effective in improving the coating ratio and, therefore, it is advantageous to use them in an amount of preferably 1 to 10% by weight and more preferably 3 to 7% by weight.

Useful multifunctional monomers are roughly divided into crosslinking multifunctional monomers characterized in that all of the plurality of functional groups possessed thereby have substantially equal reactivity and, therefore, they can form crosslinks within layers; and grafting multifunctional monomers characterized in that at least one of the plurality of functional groups possessed thereby have reactivity different from that of the others and, owing to the difference in reactivity, they can effectively form chemical bonds between layers. Although the total amount of multifunctional monomers used is as defined above, the weight ratio of them [(the crosslinking multifunctional monomer)/(the grafting multifunctional monomer)] is preferably in the range of 1/10 to 20/1 and more preferably 1/1 to 10/1. Examples of the crosslinking multifunctional monomers include acrylic or methacrylic diesters of ethylene glycol, 1,3-butylene glycol, triethylene glycol and polyethylene glycol, as well as trimethylolpropane triacrylate, triallyl isocyanurate and pentaerythritol tetraacrylate. Examples of the grafting multifunctional monomers include allyl, methacryl and crotyl esters of acrylic acid, methacrylic acid, maleic acid, fumaric acid and itaconic acid.

The intermediate layer polymer (B) is obtained by polymerizing a mixture composed of 100 parts by weight of a monomer mixture comprising 70 to 90% by weight, preferably 75 to 85% by weight and more preferably 80 to 85% by weight of an alkyl acrylate having an alkyl group of 1 to 8 carbon atoms, 10 to 30% by weight, preferably 15 to 25% by weight and more preferably 15 to 20% by weight of an aromatic vinyl monomer, and 0 to 20% by weight of another copolymerizable monomer, and 0.1 to 5 parts by weight, preferably 0.5 to 4 parts by weight and more preferably 1 to 3 parts by weight of a multifunctional monomer, in the presence of the above-described innermost layer polymer (A). Examples of the monomers and multifunctional monomers which can be used for this intermediate layer polymer (B) are the same as the monomers and multifunctional monomers which have previously been enumerated in connection with the innermost layer polymer (A). The weight ratio [(the crosslinking multifunctional monomer)/(the grafting multifunctional monomer)] is preferably in the range of 1/30 to 10/1 and more preferably 1/20 to 2/1.

The outermost layer polymer (C) is obtained by polymerizing a monomer or monomer mixture comprising 50 to 100% by weight, preferably 80 to 99% by weight and more preferably 90 to 97% by weight of an alkyl methacrylate having an alkyl group of 1 to 4 carbon atoms, 0 to 50% by weight, preferably 1 to 20% by weight and more preferably 3 to 10% by weight of an alkyl acrylate having an alkyl group of 1 to 8 carbon atoms, and 0 to 20% by weight of another copolymerizable monomer, in the presence of the polymers including the above-described innermost layer polymer (A) and intermediate layer polymer (B). Examples of the monomers which can be used for this outermost layer polymer (C) are the same as the monomers which have previously been enumerated in connection with the innermost layer polymer (A). Moreover, in order to improve compatibility with matrix resins, fluidity, impact resistance and other properties, it is desirable to use a chain transfer agent such as an alkyl mercaptan. Examples of the alkyl mercaptan include n-butyl mercaptan, n-octyl mercaptan, n-dodecyl mercaptan and t-dodecyl mercaptan. These alkyl mercaptans are preferably used in an amount of 0.1 to 2 parts by weight and more preferably 0.2 to 0.8 part by weight, per 100 parts by weight of the monomer mixture used for the outermost layer polymer (C).

The multilayered acrylic polymer of the present invention comprises three layers including the innermost layer polymer (A), the intermediate layer polymer (B) and the outermost layer polymer (C). The weight ratio [(A)/(B)] of the innermost layer polymer (A) to the intermediate layer polymer (B) is preferably in the range of 30/70 to 60/40 and more preferably 30/70 to 50/50. If the ratio of the innermost layer polymer (A) to the intermediate layer polymer (B) is unduly low, the resulting acrylic polymer will have poor transparency and resistance to impact whitening and show a reduction in falling-ball or falling-weight impact strength, and it is difficult to control the average value of the coating ratio so as to be not less than 30%. If this ratio is unduly high, the proportion of the soft intermediate layer will be decreased and the resulting acrylic polymer will also show a reduction in falling-ball or falling-weight impact strength.

The outermost layer polymer (C) consists of a polymeric component which is chemically bonded to the polymers up to the intermediate layer stage, and a polymeric component which is not chemically bonded thereto (i.e., a free polymer). The proportion of the outermost layer polymer (C) chemically bonded to the polymers up to the intermediate layer stage may be controlled by properly selecting the chain transfer agent used for the outermost layer, the grafting multifunctional monomer used for the intermediate layer, the polymerization conditions, and the like. From the viewpoint of compatibility, fluidity and impact resistance, the degree of grafting as defined by the following equation should preferably be controlled so as to be in the range of 20 to 60% and more preferably 25 to 45%.

Degree of grafting=[(weight of the outermost layer polymer chemically bonded to the polymers up to the intermediate layer stage)÷(weight of the polymers up to the intermediate layer stage)]×100(%)

If the degree of grafting is unduly low, the resulting acrylic polymer will have low falling-ball or falling-weight impact strength and poor resistance to impact whitening, while if it is unduly high, the resulting acrylic polymer will be have low falling-ball or falling-weight impact strength. In the above equation, the "weight of the outermost layer polymer chemically bonded to the polymers up to the intermediate layer stage" can be determined by subtracting the weight of the outermost layer polymer (C) extractable with a solvent such as acetone, from the total weight of the outermost layer polymer (C) present in the multilayered acrylic polymer.

One of the most important features of the present invention is that the coating ratio as defined by the following equation should be not less than 30% and preferably not less than 40% on the average.

Coating ratio=[(minimum thickness of the intermediate layer)÷(maximum thickness of the intermediate layer)]×100(%)

If this criterion is employed and its value is controlled so as to fall within the aforesaid range, the resulting acrylic polymer will show a marked improvement in impact resistance (in particular, falling-ball or falling-weight impact strength) and also an improvement in resistance to impact whitening and transparency. This fact was found for the first time by the present inventors.

The state in which the innermost layer is covered with the intermediate layer can be evaluated by melt-blending the multilayered acrylic polymer with a hard methacrylic resin or like resin which cannot be stained with ruthenium tetroxide, molding the resulting blend, staining pieces of the molded article with ruthenium tetroxide, and observing these sections under a transmission electron microscope (TEM). Specifically, in order to determine the coating ratio, pieces of the aforesaid molded article are stained by soaking them in a 0.5 wt. % aqueous solution of ruthenium tetroxide for 12 hours. Thereafter, thin sections having thickness of about 70 nm were prepared by means of a microtome and photographed at a suitable magnification under a TEM. In these photographs, the minimum and maximum thicknesses of the intermediate layer are actually measured to calculate the coating ratio. In this case, with consideration for the clearness of the photographs and errors in thickness measurement, the magnification of the photographs should have a standard value of 70,000 diameters and may range from 35,000 to 100,000 diameters and preferably from 50,000 to 80,000 diameters. Moreover, for purposes of thickness measurement, 200 or more particles of the multilayered acrylic polymer are randomly selected, and the average value of the coating ratio for these particles is determined. Particles having no detectable innermost layer, and particles having indistinct boundaries between the innermost layer and the intermediate layer and between the intermediate layer and the outermost layer should be excluded in these evaluation.

In order to control the average value of the coating ratio so as to be not less than 30%, the method for addition of the monomers and the emulsifier, the type and amount of the polymerization initiator and the like are properly selected. For example, with respect to the monomers [including the multifunctional monomer(s); the same shall apply hereinafter] for forming the innermost layer polymer (A), preferably ½0 to ⅓ and more preferably ⅒ to ¼ of the total weight of the monomers, together with the emulsifier, may previously be added to the reaction system and polymerized. Thereafter, the remainder of the mixture of the monomer and the emulsifier may be continuously added at a rate of preferably not greater than 15% by weight per hour and more preferably not greater than 10% by weight per hour as expressed in terms of the rate of increase of the added monomer concentration based on the water, and thereby polymerized. With respect to the monomers [including the multifunctional monomer(s); the same shall apply hereinafter] for forming the intermediate layer polymer (B), all monomers may be continuously added at a rate of preferably not greater than 10% by weight per hour, more preferably not greater than 7% by weight per hour and most preferably not greater than 5% by weight per hour as expressed in terms of the rate of increase of the added monomer concentration based on the water.

Moreover, in order to control the average value of the coating ratio so as to be not less than 30%, this may be accomplished, for example, by using an organic peroxide, persulfate or perborate having a W/O partition coefficient of preferably not less than 0.01 and more preferably not less than 0.05 as determined in the manner described below, as the polymerization initiator used to polymerize the intermediate layer. The amount of polymerization initiator used for this purpose is preferably in the range of 0.1 to 0.5 part by weight and more preferably 0.2 to 0.4 part by weight, per 100 parts by weight of all monomers constituting the intermediate layer polymer (B).

The W/O partition coefficient of a polymerization initiator may be determined by dissolving or dispersing the polymerization initiator in styrene so as to give a concentration of 5% by weight, mixing 2 ml of this styrene solution (or dispersion) with 20 ml of water, shaking the resulting mixture at room temperature for 4 hours, centrifuging it for 40 minutes, measuring the concentrations of the polymerization initiator in both phases according to a well-known method such as iodometry or gas chromatography, and calculating the W/O partition coefficient according to the following equation.

W/O partition coefficient=(concentration of the polymerization initiator in the aqueous phase) ÷(concentration of the polymerization initiator in the styrene phase)

The multilayered acrylic polymers of the present invention may be prepared, for example, according to any well-known emulsion polymerization process. One preferred example of the preparation process is described below.

A reaction vessel is charged with deionized water and, if necessary, an emulsifier. Then, various components for manufacturing the innermost layer polymer (A) are added thereto and polymerized to yield a latex containing dispersed particles consisting of the innermost layer polymer (A). Next, in the presence of this latex, various components for manufacturing the intermediate layer polymer (B) are added thereto and polymerized to form a shell consisting of the intermediate layer polymer (B), around the dispersed particles consisting of the innermost layer polymer (A). Subsequently, in the presence of this latex, various components for manufacturing the outermost layer polymer (C) are added thereto and polymerized to further form the outermost shell consisting of the outermost layer polymer (C), around the dispersed particles. Thus, the desired multilayered acrylic polymer is obtained.

Although the polymerization temperature may vary according to the type and amount of the polymerization initiator used, it is preferably in the range of 40 to 120° C. and more preferably 60 to 95° C. The polymerization initiator may be added to either one or both of the aqueous phase and the monomer phase.

As the emulsifier, there may be used any of various surface active agents such as anionic, cationic and nonionic surface active agents. Anionic surface active agents are especially preferred. Useful anionic surface active agents include carboxylic acid salts such as potassium oleate, sodium stearate, sodium myristate, N-lauroylsarcosinate and dipotassium alkenylsuccinate; sulfuric ester salts such as sodium lauryl sulfate; sulfonic acid salts such as dioctyl sodium sulfosuccinate, sodium dodecylbenzenesulfonate and sodium alkyl diphenyl ether disulfonate; phosphoric ester salts such as sodium polyoxyethylene alkylphenyl ether phosphate; and the like.

No particular limitation is placed on the average particle diameter of the multilayered acrylic polymer. However, at the stage where the polymerization has been carried out up to the intermediate layer, it is preferably in the range of 0.05 to 0.5 μm and more preferably 0.2 to 0.35 μm.

The polymer latex obtained by the emulsion polymerization may be coagulated according to any of well-known coagulation techniques such as acid coagulation, salt coagulation, freeze coagulation and spray drying. For purposes of acid coagulation, there may be used inorganic acids such as sulfuric acid, hydrochloric acid and phosphoric acid; organic acids such as acetic acid; and the like. For purposes of salt coagulation, there may be used inorganic salts such as sodium sulfate, magnesium sulfate, aluminum sulfate and calcium chloride; organic salts such as calcium acetate and magnesium acetate; and the like. The coagulated polymer may further be washed, dehydrated and dried.

The above-described multilayered acrylic polymers of the present invention are especially useful for applications in which they are incorporated into thermoplastic resin compositions such as methacrylic resin compositions.

In particular, a methacrylic resin composition in accordance with the present invention comprises 5 to 95% by weight of a multilayered acrylic polymer in accordance with the present invention and 95 to 5% by weight of a methacrylic resin composed chiefly of methyl methacrylate. This methacrylic resin composition has excellent impact resistance (in particular, falling-ball or falling-weight impact strength), resistance to impact whitening, and transparency. If the proportions of the multilayered acrylic polymer and the hard methacrylic resin are beyond the aforesaid limits, the resulting methacrylic resin composition will have poor impact resistance, resistance to impact whitening, and transparency.

The hard methacrylic resin used in this methacrylic resin composition should preferably contains methyl methacrylate units as major repeating units. Specifically, it is preferable that the proportion of methyl methacrylate units be not less than 50% by weight. In this case, the resulting methacrylic resin composition will be excellent in transparency and weather resistance.

Although no particular limitation is placed on the method for mixing the multilayered acrylic polymer with the hard methacrylic resin, melt blending is preferred. If necessary, antioxidants (e.g., hindered phenol type, phosphite type and thioether type antioxidants), light stabilizers (e.g., hindered amine type, benzotriazole type, benzophenone type, benzoate type and organic nickel type light stabilizers), lubricants, plasticizers, dyes, pigments, fillers and the like may suitably be added prior to melt blending. Thereafter, the resulting mixture may be blended in a V-type blender, Henschel mixer or the like, and then melt-kneaded at a temperature of 150 to 300° C. in a mixing roll mill, a screw type extruder or the like.

The methacrylic resin compositions of the present invention which are prepared in the above-described manner may be molded by means of an extrusion molding machine, an injection molding machine or the like to yield molded articles having excellent impact resistance, resistance to impact whitening, and transparency and lowering the variation of haze with temperature.

The present invention is more specifically explained with reference to the following examples. However, these examples are not to be construed to limit the scope of the present invention. In these examples, all parts are by weight and all percentages, except those expressing hazes, are by weight, unless otherwise stated.

The abbreviations used in these examples represent the following respective compounds.
MMA: methyl methacrylate
MA: methyl acrylate
BA: n-butyl acrylate
AMA: allyl methacrylate
DMA: Diallyl maleate
St: styrene
EDMA: ethylene glycol dimethacrylate
BDMA: 1,3-butylene glycol dimethacrylate
n-OM: n-octyl mercaptan
t-DM: t-dodecyl mercaptan
KPS: potassium persulfate
CHP: cumene hydroperoxide
t-HH: t-hexyl hydroperoxide
DBP: di-t-butyl peroxide
EDTA.2Na: disodium ethylenediaminetetraacetate dihydrate
SFS: sodium formaldehyde sulfoxylate
Emulsifier (1): a partial neutralization product of a mixture composed of 40% of mono(polyoxyethylene nonylphenyl ether) phosphate and 60% of di(polyoxyethylene nonylphenyl ether) phosphate.

Various properties shown in the examples were measured according to the following procedures.
(Falling-weight Impact Test)

Using a PS60E9ASE Injection Molding Machine manufactured by Nissei Resin Co., Ltd., specimens measuring 110×110×3.5 mm were made at a cylinder temperature of 260° C. Then, they were tested with an HTM-1 High-velocity Impact Tester manufactured by Shimadzu Corp. (having a tap diameter of ½ inch, an impact seat inside diameter of 40 mm, and a tap traveling speed of 4.4 m/sec). The average value of the energy required up to the maximum load point for five specimens was regarded as the falling-weight impact strength.
(Impact Whitening Test)

Using an SHT45-B Extruder manufactured by Hitachi Zosen Corp., a 3 mm thick extruded plate was made at a cylinder temperature of 250° C. A specimen measuring 150×150 mm out of this plate. When an iron ball weighing 535 g was dropped onto the specimen from a height of 2 m, the degree of whitening was visually observed and compared [resistance to impact whitening: ⊚(best)>○>X>XX (worst)].

(Measurement of Haze)

Using a PS60E9ASE Injection Molding Machine manufactured by Nissei Resin Co., Ltd., a specimen measuring 100×50×2 mm was made at a cylinder temperature of 260° C. Then, its haze was measured according to ASTM D1003.

(Measurement of the Coating Ratio)

Using a PS60E9ASE Injection Molding Machine manufactured by Nissei Resin Co., Ltd., a specimen measuring 100×50×2 mm was made at a cylinder temperature of 260° C. Then, pieces of suitable size were cut out and stained by soaking them in a 0.5 wt. % aqueous solution of ruthenium tetroxide at room temperature for 12 hours. Thereafter, thin sections having thickness of about 70 nm were prepared by means of a microtome and photographed at a magnification of 70,000 diameters under a transmission electron microscope (TEM). From these photographs, 200 particles having clear-cut boundaries between the innermost layer and the intermediate layer and between the intermediate layer and the outermost layer were randomly selected. Then, the minimum and maximum thicknesses of the intermediate layer in each particle were actually measured to calculate the coating ratio, and the average value thereof was determined.

(Measurement of the Degree of Grafting)

About 1 g of a powder of a multilayered acrylic polymer, which had been obtained by coagulating and drying a latex, was accurately weighed, suspended in 50 ml of acetone, and refluxed for 6 hours. Using a CR22 High-speed Refrigerating Centrifuge manufactured by Hitachi Koki Co., Ltd., this suspension was centrifuged at 14,000 rpm for 30 minutes and shaken for 30 minutes, and this procedure was repeated twice. After this suspension was centrifuged again for 30 minutes, its acetone-insoluble fraction was separated and dried, and the degree of grafting was determined according to the following equation.

Degree of grafting=$[(W_1-W_0 \times R) \div (W_0 \times R)] \times 100 (\%)$ where $W_0$ is the weight (g) of the sample, $W_1$ is the weight (g) of the acetone-insoluble fraction, and R is the weight ratio of (the innermost layer+the intermediate layer) to the whole multilayered acrylic polymer.

(Reference Example 1: Measurement of the W/O Partition Coefficients of CHP and t-HH)

The polymerization initiator CHP or t-HH was dissolved in styrene so as to give a concentration of 5% by weight. 2 ml of this styrene solution was mixed with 20 ml of water, and the resulting mixture was shaken at room temperature for 4 hours and centrifuged for 40 minutes. Then, the concentrations of the polymerization initiator in both layers were measured by iodometry. Specifically, a 300 ml flask fitted with a cooling coil was charged with 30 ml of isopropyl alcohol, 2 ml of a saturated aqueous solution of glacial acetic acid, and 2 ml of a saturated aqueous solution of potassium iodide. Then, about 0.1 g of a sample was accurately weighed and added thereto. The cooling coil was connected and the mixture was gently boiled on a hot plate for 3 minutes. Immediately after that, the mixture was titrated with an N/10 solution of sodium thiosulfate until the color of iodine disappeared. Thus, the concentration of the polymerization initiator was determined.

On the basis of the concentrations of the polymerization initiator in both layers, its W/O partition coefficient was calculated according to the following equation.

W/O partition coefficient=(concentration of the polymerization initiator in the aqueous phase)÷(concentration of the polymerization initiator in the styrene layer)

The results thus obtained are shown in Table 1 below.

TABLE 1

|  | W/O partition coefficient |
|---|---|
| CHP | 0.02 |
| t-HH | 0.06 |

(Reference Example 2: Measurement of the W/O partition coefficient of DBP)

The W/O partition coefficient of DBP was determined in the same manner as described in Reference Example 1, except that concentration measurements were made by gas chromatography using a GC-8APF Gas Chromatograph manufactured by Shimadzu Corp. Its W/O partition coefficient was 0.00.

(Reference Example 3: Measurement of the W/O Partition Coefficient of KPS)

KPS is substantially insoluble in styrene (with a solubility of not greater than 0.1%) and its solubility in water is not less than 30% at room temperature. Accordingly, the W/O partition coefficient of KPS was assumed to be not less than 20.

EXAMPLE 1

A reaction vessel fitted with a reflux condenser was charged with 300 parts of ion-exchanged water, 0.09 part of sodium carbonate, and 0.9 part of boric acid, and heated to 80° C. Then, ⅕ of a mixture composed of 45 parts of monomer mixture (a-1) shown in Table 2 below [the reference numbers of the monomer mixtures used hereafter similarly correspond to those shown in Table 2 below] and 0.3 part of emulsifier (1) was added thereto, followed by the addition of 0.05 part of the polymerization initiator KPS. After the resulting reaction mixture was allowed to stand for 15 minutes, the remainder of the monomer-emulsifier mixture was continuously added thereto at a rate of 13% per hour as expressed in terms of the rate of increase of the monomer mixture based on the water. Thereafter, the reaction mixture was allowed to stand for 1 hour, so that the polymerization of the innermost layer was effected to yield a latex.

Subsequently, in the presence of this latex, 0.1 part of the polymerization initiator KPS was added thereto. Then, a mixture composed of 55 parts of monomer mixture (b-1) and 0.5 part of emulsifier (1) was continuously added thereto at a rate of 8% per hour as expressed in terms of the rate of increase of the monomer mixture based on the water. Thereafter, the reaction mixture was allowed to stand for 2.5 hours, so that the polymerization of the intermediate layer was effected.

Subsequently, in the presence of this latex, 0.05 part of the polymerization initiator KPS was added thereto. After this latex was allowed to stand for 15 minutes, 80 parts of monomer mixture (c-1) was continuously added thereto at a rate of 10% per hour as expressed in terms of the rate of increase of the monomer mixture based on the water. Thereafter, the reaction mixture was allowed to stand for 1 hour, so that the polymerization of the outermost layer was effected to yield a latex of a multilayered acrylic polymer.

Subsequently, this latex was coagulated with an aqueous solution of calcium acetate, washed, dehydrated and dried to yield a powder of the multilayered acrylic polymer.

Using a Henschel mixer, 45 parts of the resulting powder was mixed with 55 parts of a hard methacrylic resin composed of MMA and MA (in a weight ratio of 97:3). Then, using a 40 mm single screw extruder, this mixture was melt-kneaded at a cylinder temperature of 230–270° C. and a die temperature of 260° C. The resulting methacrylic resin composition in pellet form was injection-molded or extrusion-molded into specimens.

EXAMPLE 2

A reaction vessel fitted with a reflux condenser was charged with 300 parts of ion-exchanged water, and heated to 80° C. Then, $6 \times 10^{-5}$ part of iron(II) sulfate heptahydrate, $1.5 \times 10^{-4}$ part of EDTA.2Na, and 0.3 part of SFS were added thereto. Thereafter, 1/10 of a mixture composed of 40 parts of monomer mixture (a-2), 0.1 part of the polymerization initiator t-HH, and 1.2 parts of emulsifier (1) was added thereto. After the resulting reaction mixture was allowed to stand for 15 minutes, the remainder of the monomer-emulsifier mixture was continuously added thereto at a rate of 8% per hour as expressed in terms of the rate of increase of the monomer mixture based on the water. Thereafter, the reaction mixture was allowed to stand for 1 hour, so that the polymerization of the innermost layer was effected.

Subsequently, in the presence of this latex, 0.3 part of SFS was added thereto. Then, a mixture composed of 60 parts of monomer mixture (b-2), 0.2 part of the polymerization initiator t-HH, and 1 part of emulsifier (1) was continuously add thereto at a rate of 4% per hour as expressed in terms of the rate of increase of the monomer mixture based on the water. Thereafter, the reaction mixture was allowed to stand for 2 hours, so that the polymerization of the intermediate layer was effected.

Subsequently, in the presence of this latex, 0.2 part of SFS was added thereto. After this latex was allowed to stand for 15 minutes, 60 parts of monomer mixture (c-2) and 0.1 part of the initiator t-HH were continuously added thereto at a rate of 10% per hour as expressed in terms of the rate of increase of the monomer mixture based on the water. Thereafter, the reaction mixture was allowed to stand for 1 hour, so that the polymerization of the outermost layer was effected to yield a latex of a multilayered acrylic polymer. Thereafter, specimens were made in the same manner as described in Example 1.

EXAMPLE 3

A reaction vessel fitted with a reflux condenser was charged with 300 parts of ion-exchanged water, 0.09 part of sodium carbonate, and 0.9 part of boric acid, and heated to 80° C. Then, 1/10 of a mixture composed of 40 parts of monomer mixture (a-3) and 0.4 part of emulsifier (1) was added thereto, followed by the addition of 0.05 part of the polymerization initiator KPS. After the resulting reaction mixture was allowed to stand for 15 minutes, the remainder of the monomer-emulsifier mixture was continuously added thereto at a rate of 8% per hour as expressed in terms of the rate of increase of the monomer mixture based on the water. Thereafter, the reaction mixture was allowed to stand for 1 hour, so that the polymerization of the innermost layer was effected.

Subsequently, in the presence of this latex, 0.1 part of the polymerization initiator KPS was added thereto. Then, a mixture composed of 60 parts of monomer mixture (b-3) and 0.6 part of emulsifier (1) was continuously added thereto at a rate of 4% per hour as expressed in terms of the rate of increase of the monomer mixture based on the water. Thereafter, the reaction mixture was allowed to stand for 2.5 hours, so that the polymerization of the intermediate layer was effected.

Subsequently, in the presence of this latex, 0.05 part of KPS was added thereto. After this latex was allowed to stand for 15 minutes, 60 parts of monomer mixture (c-3) was continuously added thereto at a rate of 10% per hour as expressed in terms of the rate of increase of the monomer mixture based on the water. Thereafter, the reaction mixture was allowed to stand for 1 hour, so that the polymerization of the outermost layer was effected to yield a latex of a multilayered acrylic polymer. Thereafter, specimens were made in the same manner as described in Example 1.

Comparative Example 1

Specimens were made in the same manner as described in Example 3, except that the monomer mixture used for the innermost layer of the multilayered acrylic polymer was altered to (a-4).

EXAMPLE 4

A reaction vessel fitted with a reflux condenser was charged with 300 parts of ion-exchanged water, 0.09 part of sodium carbonate, and 0.9 part of boric acid, and heated to 80° C. Then, 1/8 of a mixture composed of 35 parts of monomer mixture (a-5) and 0.1 part of emulsifier (1) was added thereto, followed by the addition of 0.05 part of the polymerization initiator KPS. After the resulting reaction mixture was allowed to stand for 15 minutes, the remainder of the monomer-emulsifier mixture was continuously added thereto at a rate of 8% per hour as expressed in terms of the rate of increase of the monomer mixture based on the water. Thereafter, the reaction mixture was allowed to stand for 1 hour, so that the polymerization of the innermost layer was effected.

Subsequently, in the presence of this latex, 0.15 part of the polymerization initiator KPS was added thereto. Then, a mixture composed of 65 parts of monomer mixture (b-5) and 0.5 part of emulsifier (1) was continuously added thereto at a rate of 6% per hour as expressed in terms of the rate of increase of the monomer mixture based on the water. Thereafter, the reaction mixture was allowed to stand for 3 hours, so that the polymerization of the intermediate layer was effected.

Subsequently, in the presence of this latex, 0.05 part of KPS was added thereto. After this latex was allowed to stand for 15 minutes, 60 parts of monomer mixture (c-5) was continuously added thereto at a rate of 10% per hour as expressed in terms of the rate of increase of the monomer mixture based on the water. Thereafter, the reaction mixture was allowed to stand for 1 hour, so that the polymerization of the outermost layer was effected to yield a latex of a multilayered acrylic polymer. Thereafter, specimens were made in the same manner as described in Example 1.

TABLE 2

| | Monomer mixture (parts) | | | | | | | | | | | | |
|---|---|---|---|---|---|---|---|---|---|---|---|---|---|
| | a-1 | b-1 | c-1 | a-2 | b-2 | c-2 | a-3 | b-3 | c-3 | a-4 | a-5 | b-5 | c-5 |
| MMA | 95 | | 95 | 50.5 | 95 | | 56 | | 95 | 30 | 80 | | 95 |
| MA | 5 | | 5 | | | 5 | | | 5 | | 20 | | 5 |
| BA | | 83 | | 45 | 83 | | 40 | 83 | | 63 | | 83 | |
| St | | 17 | | 4.5 | 17 | | 4 | 17 | | 7 | | 17 | |
| BDMA | 3 | | | | | | 3 | | | 3 | 1 | 0.3 | |
| EDMA | | | | 3 | 0.2 | | | 0.25 | | | | | |
| AMA | | 2 | | 0.5 | | | 0.3 | | | 0.3 | 0.5 | 1.5 | |
| DAM | | | | | 1.5 | | | 1.5 | | | | | |
| t-DM | | | 1 | | | 0.5 | | | 0.5 | | | | |
| n-OM | | | | | | | | | | | | | 0.3 |

EXAMPLE 5 and

Comparative Examples 2 and 3

Specimens were made in the same manner as described in Example 4, except that, in the formation of the innermost layer, the proportion of the monomer-emulsifier mixture previously added before addition of the polymerization initiator was altered as shown in Table 3 below.

TABLE 3

| | Proportion of the monomer-emulsifier mixture added before addition of the polymerization initiator |
|---|---|
| Ex. 5 | 1/15 |
| Co. Ex. 2 | 1/2 |
| Co. Ex. 3 | 1/1 |

EXAMPLE 6 and

Comparative Example 4

Specimens were made in the same manner as described in Example 4, except that, when the monomer-emulsifier mixture forming the innermost layer was added after addition of the polymerization initiator, the rate of increase of the monomer mixture based on the water (i.e., the rate of addition) was altered as shown in Table 4 below.

TABLE 4

| | Rate of increase of the monomer mixture (% per hour) |
|---|---|
| Ex. 6 | 12 |
| Co. Ex. 4 | 18 |

EXAMPLE 7

The same procedure as described in Example 4 was carried out up to the polymerization of the innermost layer. In the presence of this latex, $2.5 \times 10^{-5}$ part of iron(II) sulfate heptahydrate, $7.5 \times 10^{-5}$ part of EDTA.2Na, and 0.4 part of SFS were added thereto. After this latex was allowed to stand for 15 minutes, a mixture composed of 65 parts of monomer mixture (b-5), 0.15 part of the polymerization initiator CHP, and 0.5 part of emulsifier (1) was continuously added thereto at a rate of 6% per hour as expressed in terms of the rate of increase of the monomer mixture based on the water. Thereafter, the reaction mixture was allowed to stand for 3 hours, so that the polymerization of the intermediate layer was effected.

Subsequently, in the presence of this latex, 0.2 part of SFS was added thereto. After this latex was allowed to stand for 15 minutes, a mixture composed of 60 parts of monomer mixture (c-5) and 0.1 part of the polymerization initiator t-HH was continuously added thereto at a rate of 10% per hour as expressed in terms of the rate of increase of the monomer mixture based on the water. Thereafter, the reaction mixture was allowed to stand for 1 hour, so that the polymerization of the outermost layer was effected to yield a latex of a multilayered acrylic polymer. Thereafter, specimens were made in the same manner as described in Example 4.

Comparative Example 5

Specimens were made in the same manner as described in Example 7, except that the polymerization initiator added for the polymerization of the intermediate layer was altered to DBP.

Comparative Example 6

Specimens were made in the same manner as described in Example 4, except that the amount of the polymerization initiator KPS added for the polymerization of the intermediate layer was altered to 0.05 part.

Comparative Example 7

A reaction vessel fitted with a reflux condenser was charged with 300 parts of ion-exchanged water, 0.09 part of sodium carbonate, and 0.9 part of boric acid, and heated to 80° C. Then, ⅛ of a mixture composed of 20 parts of monomer mixture (a-5) and 0.57 part of emulsifier (1) was added thereto, followed by the addition of 0.03 part of the polymerization initiator KPS. After the resulting reaction mixture was allowed to stand for 15 minutes, the remainder of the monomer-emulsifier mixture was continuously added thereto at a rate of 8% per hour as expressed in terms of the rate of increase of the monomer mixture based on the water. Thereafter, the reaction mixture was allowed to stand for 1 hour, so that the polymerization of the innermost layer was effected.

Subsequently, in the presence of this latex, 0.18 part of the polymerization initiator KPS was added thereto. Then, a mixture composed of 80 parts of monomer mixture (b-5) and 0.62 part of emulsifier (1) was continuously added thereto at a rate of 6% per hour as expressed in terms of the rate of increase of the monomer mixture based on the water.

Thereafter, the reaction mixture was allowed to stand for 3 hours, so that the polymerization of the intermediate layer was effected. Thereafter, specimens were made in the same manner as described in Example 1.

EXAMPLE 8

A reaction vessel fitted with a reflux condenser was charged with 300 parts of ion-exchanged water, 0.09 part of sodium carbonate, and 0.9 part of boric acid, and heated to 80° C. Then, ⅛ of a mixture composed of 55 parts of monomer mixture (a-5) and 0.19 part of emulsifier (1) was added thereto, followed by the addition of 0.08 part of the polymerization initiator KPS. After the resulting reaction mixture was allowed to stand for 30 minutes, the remainder of the monomer-emulsifier mixture was continuously added thereto at a rate of 8% per hour as expressed in terms of the rate of increase of the monomer mixture based on the water. Thereafter, the reaction mixture was allowed to stand for 2 hours, so that the polymerization of the innermost layer was effected.

Subsequently, in the presence of this latex, 0.10 part of the polymerization initiator KPS was added thereto. Then, a mixture composed of 45 parts of monomer mixture (b-5) and 0.27 part of emulsifier (1) was continuously added thereto at a rate of 6% per hour as expressed in terms of the rate of increase of the monomer mixture based on the water. Thereafter, the reaction mixture was allowed to stand for 2 hours, so that the polymerization of the intermediate layer was effected. Thereafter, specimens were made in the same manner as described in Example 1.

EXAMPLES 9 and 10 and

Comparative Example 8

Specimens were made in the same manner as described in Example 4, except that, when the monomer-emulsifier mixture forming the intermediate layer was added, the rate of increase of the monomer mixture based on the water (i.e., the rate of addition) was altered as shown in Table 5 below.

TABLE 5

| | Rate of increase of the monomer mixture (% per hour) |
|---|---|
| Ex. 9 | 8 |
| Ex. 10 | 4 |
| Co. Ex. 8 | 15 |

EXAMPLE 11 to 13

Specimens were made in the same manner as described in Example 4, except that the composition of the monomer mixture forming the outermost layer and its number of parts were altered as shown in Table 6 below.

TABLE 6

| | Monomer mixture for the outermost layer | | |
|---|---|---|---|
| | | Composition | parts |
| Ex. 11 | MMA | 95 | 60 |
| | MA | 5 | |
| | t-DM | 0.15 | |
| Ex. 12 | MMA | 95 | 80 |
| | MA | 5 | |
| | t-DM | — | |
| Ex. 13 | MMA | 95 | 110 |
| | MA | 5 | |
| | t-DM | 0.15 | |

The results of evaluation of the specimens obtained in the foregoing examples and the results of measurement of the coating ratio and the degree of grafting are summarized in Table 7.

TABLE 7

| | Coating Ratio (%) | (A)/(B) | (A+B)/(C) | Degree of grafting (%) | Falling-weight impact strength (kgfmm) | Resistance to impact whitening | Haze (%) |
|---|---|---|---|---|---|---|---|
| Ex. 1 | 34 | 45/55 | 100/80 | 35 | 850 | ○ | 1.0 |
| Ex. 2 | 42 | 40/60 | 100/60 | 38 | 1150 | ○ | 0.7 |
| Ex. 3 | 48 | 40/60 | ↑ | 39 | 1250 | ○ | 0.7 |
| Co. Ex. 1 | 38 | ↑ | ↑ | 38 | 740 | xx | 1.7 |
| Ex. 4 | 37 | 35/65 | ↑ | 36 | 900 | ○ | 1.0 |
| Ex. 5 | 35 | ↑ | ↑ | 37 | 850 | ○ | 1.2 |
| Co. Ex. 2 | 26 | ↑ | ↑ | 37 | 630 | x | 1.6 |
| Co. Ex. 3 | 21 | ↑ | ↑ | 37 | 580 | x | 1.6 |
| Ex. 6 | 34 | ↑ | ↑ | 36 | 830 | ○ | 1.1 |
| Co. Ex. 4 | 25 | ↑ | ↑ | 35 | 620 | x | 1.5 |
| Ex. 7 | 35 | ↑ | ↑ | 39 | 860 | ○ | 1.2 |
| Co. Ex. 5 | 24 | ↑ | ↑ | 37 | 630 | x | 1.7 |
| Co. Ex. 6 | 23 | ↑ | ↑ | 35 | 620 | x | 1.9 |
| Co. Ex. 7 | 28 | 20/80 | ↑ | 42 | 750 | xx | 2.0 |
| Ex. 8 | 31 | 55/45 | ↑ | 34 | 790 | ○ | 1.2 |
| Ex. 9 | 33 | 35/65 | ↑ | 35 | 800 | ○ | 1.1 |
| Ex. 10 | 39 | ↑ | ↑ | 40 | 970 | ○ | 0.9 |
| Co. Ex. 8 | 19 | ↑ | ↑ | 34 | 530 | x | 1.8 |
| Ex. 11 | 38 | ↑ | ↑ | 50 | 850 | ⊙ | 1.0 |
| Ex. 12 | 38 | ↑ | 100/80 | 65 | 820 | ⊙ | 1.0 |
| Ex. 13 | 38 | ↑ | 100/110 | 70 | 810 | ⊙ | 1.0 |

What is claimed is:

1. A multilayered acrylic polymer comprising:

an innermost layer polymer (A) obtained by polymerizing a mixture composed of 100 parts by weight of a monomer or monomer mixture comprising
- 40 to 100% by weight of an alkyl methacrylate having an alkyl group of 1 to 4 carbon atoms,
- 0 to 60% by weight of an alkyl acrylate having an alkyl group of 1 to 8 carbon atoms, and
- 0 to 20% by weight of another copolymerizable monomer, and 0.1 to 10 parts by weight of a multifunctional monomer;

an intermediate layer polymer (B) obtained by polymerizing a mixture composed of 100 parts by weight of a monomer mixture comprising
- 70 to 90% by weight of an alkyl acrylate having an alkyl group of 1 to 8 carbon atoms, 10 to 30% by weight of an aromatic vinyl monomer, and
- 0 to 20% by weight of another copolymerizable monomer, and 0.1 to 5 parts by weight of a multifunctional monomer, in the presence of the innermost layer polymer (A); and an outermost layer polymer (C) obtained by polymerizing a monomer or monomer mixture comprising 50 to 100% by weight of an alkyl methacrylate having an alkyl group of 1 to 4 carbon atoms, 0 to 50% by weight of an alkyl acrylate having an alkyl group of 1 to 8 carbon atoms, and 0 to 20% by weight of another copolymerizable monomer, in the presence of the innermost layer polymer (A) and the intermediate layer polymer (B);

and wherein the average value of the coating ratio as defined by the following equation is not less than 30%:

Coating ratio={(minimum thickness of the intermediate layer)÷(maximum thickness of the intermediate layer)}×100 (%).

2. A multilayered acrylic polymer as claimed in claim 1 which comprises:

the innermost layer polymer (A) obtained by polymerizing a mixture composed of 100 parts by weight of a monomer mixture comprising 40 to 95% by weight of the alkyl methacrylate, 4 to 59% by weight of the alkyl acrylate, 1 to 10% by weight of the aromatic vinyl monomer, and 0 to 10% by weight of another copolymerizable monomer, and 1 to 5 parts by weight of the multifunctional monomer;

the intermediate layer polymer (B) obtained by polymerizing a mixture composed of 100 parts by weight of a monomer mixture comprising 75 to 85% by weight of the alkyl acrylate, 15 to 25% by weight of the aromatic vinyl monomer, and 0 to 10% by weight of another copolymerizable monomer, and 0.5 to 4 parts by weight of the multifunctional monomer; and the outermost layer polymer (C) obtained by polymerizing a monomer mixture comprising 80 to 99% by weight of the alkyl methacrylate, 1 to 20% by weight of the alkyl acrylate, and 0 to 19% by weight of another copolymerizable monomer.

3. A multilayered acrylic polymer as claimed in claim 1 wherein the weight ratio [(A)/(B)] of the innermost layer polymer (A) to the intermediate layer polymer (B) is in the range of 30/70 to 50/50.

4. A multilayered acrylic polymer as claimed in claim 1, wherein the degree of grafting as defined by the following equation is in the range of 20 to 60%:

Degree of grafting={(weight of the outermost layer polymer chemically bonded to the polymers up to the intermediate layer stage)÷(weight of the polymers up to the intermediate layer stage)}×100 (%).

5. A methacrylic resin composition comprising 5 to 95% by weight of a multilayered acrylic polymer as claimed in claim 1, and 95 to 5% by weight of a methacrylic resin composed chiefly of methyl methacrylate.

* * * * *